United States Patent
Markwart et al.

(10) Patent No.: US 10,070,444 B2
(45) Date of Patent: Sep. 4, 2018

(54) COORDINATED SPECTRUM ALLOCATION AND DE-ALLOCATION TO MINIMIZE SPECTRUM FRAGMENTATION IN A COGNITIVE RADIO NETWORK

(75) Inventors: Christian Markwart, Munich (DE); Ruediger Halfmann, Otterberg (DE)

(73) Assignee: NOKIA SOLUTIONS AND NETWORKS OY, Espoo (FI)

( * ) Notice: Subject to any disclaimer, the term of this patent is extended or adjusted under 35 U.S.C. 154(b) by 599 days.

(21) Appl. No.: 14/361,904

(22) PCT Filed: Dec. 2, 2011

(86) PCT No.: PCT/EP2011/071678
§ 371 (c)(1),
(2), (4) Date: May 30, 2014

(87) PCT Pub. No.: WO2013/079122
PCT Pub. Date: Jun. 6, 2013

(65) Prior Publication Data
US 2014/0307701 A1    Oct. 16, 2014

(51) Int. Cl.
*H04W 72/00* (2009.01)
*H04W 72/04* (2009.01)

(52) U.S. Cl.
CPC ....... *H04W 72/0493* (2013.01); *H04W 72/00* (2013.01)

(58) Field of Classification Search
CPC ............. H04W 72/0493; H04W 72/00; H04W 72/085; H04W 16/14; H04W 72/02; H04B 17/309; H04B 17/00; H04N 5/50
See application file for complete search history.

(56) References Cited

U.S. PATENT DOCUMENTS

| | | | |
|---|---|---|---|
| 2005/0128971 A1* | 6/2005 | Huschke | H04W 16/14 370/328 |
| 2006/0063533 A1 | 3/2006 | Matoba et al. | |

(Continued)

FOREIGN PATENT DOCUMENTS

| | | |
|---|---|---|
| CN | 1115198 A | 1/1996 |
| CN | 101155417 A | 4/2008 |

(Continued)

OTHER PUBLICATIONS

International Search Report dated Oct. 12, 2012 corresponding to International Patent Application No. PCT/EP2011/071678.

(Continued)

*Primary Examiner* — Andrew Chriss
*Assistant Examiner* — Peter Mak
(74) *Attorney, Agent, or Firm* — Squire Patton Boggs (US) LLP

(57) ABSTRACT

An apparatus and a method are described, by which a fragmentation probability is determined which indicates a probability of fragmentation of frequency resources in at least one network section for at least one network operating entity. Moreover, an apparatus and a method are described, by which frequency resources in at least one network section are allocated and/or de-allocated, priorities of frequency resources are defined for at least one network operating entity individually, and allocating and/or de-allocating of the frequency resources for the at least one network operating entity is performed based on the priorities. For allocating and/or de-allocating of the frequency resources, also the fragmentation probability may be taken into account.

18 Claims, 9 Drawing Sheets

(56) References Cited

U.S. PATENT DOCUMENTS

| | | |
|---|---|---|
| 2008/0198948 A1* | 8/2008 | Tang ............... H04W 72/02 375/316 |
| 2009/0092084 A1 | 4/2009 | Kim et al. |
| 2009/0203381 A1 | 8/2009 | Ueda |
| 2009/0215452 A1 | 8/2009 | Balasubramanian et al. |
| 2010/0111209 A1 | 5/2010 | Frenger |
| 2010/0216477 A1 | 8/2010 | Ryan |
| 2011/0028097 A1* | 2/2011 | Memik ............. H04W 72/085 455/62 |
| 2011/0077042 A1* | 3/2011 | Stanforth ............ H04W 72/10 455/512 |
| 2011/0228693 A1 | 9/2011 | Larsson et al. |
| 2011/0287802 A1* | 11/2011 | Ma ..................... H04L 5/0066 455/517 |
| 2012/0063373 A1* | 3/2012 | Chincholi ............. H04L 5/001 370/281 |
| 2012/0224691 A1* | 9/2012 | Purohit .................. H04L 1/04 380/255 |

FOREIGN PATENT DOCUMENTS

| | | |
|---|---|---|
| CN | 101466100 A | 6/2009 |
| CN | 101741803 A | 6/2010 |
| CN | 101800997 A | 8/2010 |
| WO | WO 95/07013 A1 | 3/1995 |
| WO | WO 99/12271 A1 | 3/1999 |
| WO | WO 01/56179 A1 | 8/2001 |

OTHER PUBLICATIONS

Wu Lili "Study on GSM Frequency Reuse" Master's Theses Full-text Database, No. 7,I136-352, Nov. 2005.

English Language Translation of Chinese Office Action dated May 3, 2017, issued in CN corresponding Application No. 201180075267.1.

* cited by examiner

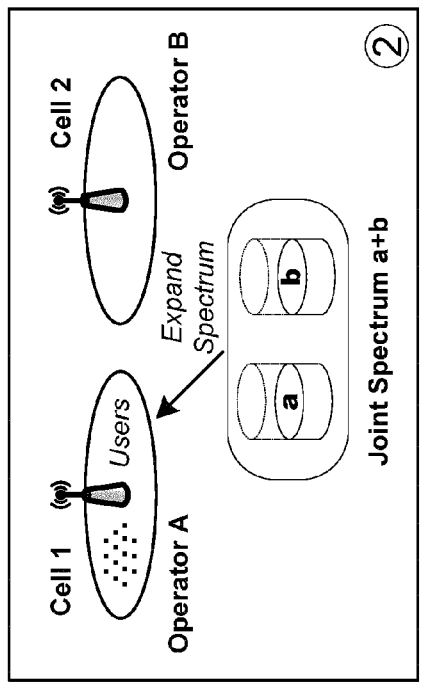
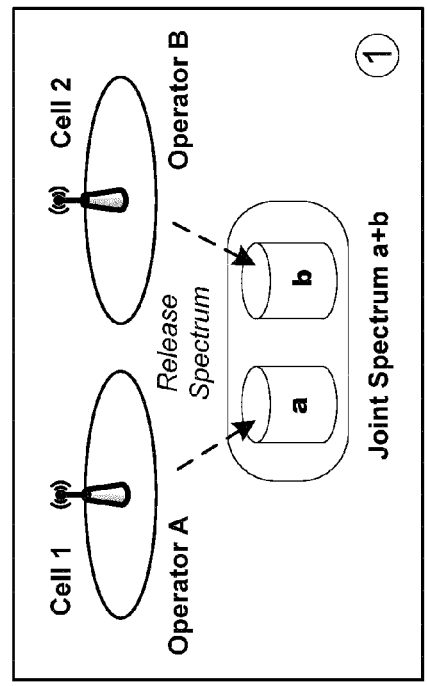
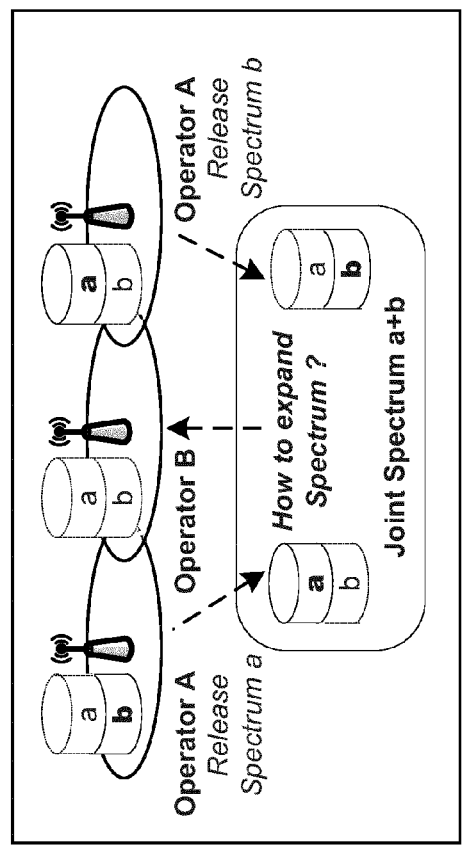
Fig. 2
Fig. 3

COORDINATED SPECTRUM ALLOCATION AND DE-ALLOCATION TO MINIMIZE SPECTRUM FRAGMENTATION IN A COGNITIVE RADIO NETWORK

FIELD OF THE INVENTION

The present invention relates to apparatuses, methods and a computer program product for a coordinated spectrum allocation and de-allocation to minimize spectrum fragmentation in a Cognitive Radio Network.

RELATED BACKGROUND ART

The following meanings for the abbreviations used in this specification apply:
BS Base Station
CRN Cognitive Radio Network
HO Hand Over
KPI Key Performance Parameter
MME Mobility Management Entity
MORAN Multi Operator Radio Access Network
MOCN Multi Operator Core Network
OAM Operation And Maintenance
RAN Radio Access Network
RAT Radio Access Technology
UE User Equipment Embodiments of the present invention relate to base stations (Macro, Pico and Femto) which form a cognitive radio network (CRN).

In mobile networks spectrum utilization and allocation is performed via static configurations based on network planning data of a Mobile Network Operator MNO. With introduction of cognitive radio methods it is not longer possible to stay with these static configurations. Moreover the principle of 'my spectrum—my usage' will not hold any longer. In other words Dynamic Spectrum Allocation (DSA) will lead to a paradigm change in mobile communication industry. Spectrum is not longer exclusively assigned to a single operator but jointly used by several operators with the obligation to use it collectively under fair conditions.

Today a specific spectrum block in a predefined area (e.g. region or country) is typically owned by a Mobile Network Operator. When operators share their spectrum blocks with other operators to form a joint cognitive radio network it is necessary to define a policy which exactly defines the rules how the spectrum is assigned to and released by each operator. The basic principle of such a policy is shown in FIG. 2. Operator A owns spectrum a and Operator B owns spectrum b. The spectrum is released when there is no need for it in the cell (left part of FIG. 2) and the spectrum is expanded when it is needed, e.g. users enters the cell (right part of FIG. 2). Even more complex policies follow this basic principle.

The advantage of forming a joint cognitive radio network is that each Operator is not longer bound to the owned spectrum only, i.e. Operator A uses spectrum x and Operator B uses spectrum y but both Operators are allowed to use spectrum x as well as spectrum y when it is available for usage in a specific area. Therefore, Spectrum Sharing in an defined area leads to a higher spectrum efficiency than the traditional dedicated assignment of spectrum. It is obvious that after a while spectrum x and spectrum y will mix up in Operator Network A and B. The situation will become even worse when Operators A and B offer several spectrum blocks for the common usage or further Operators (e.g. Operator C, D, . . . ) with or without adding owned spectrum are joining.

Further the fragmentation of the spectrum increases with finer granularity of the defined spectrum blocks.

The fragmentation of the spectrum used by an Operator issues a lot of disadvantages. An example is shown in FIG. 3. There is an area which consists of 3 Base Stations BS (left and right belongs to Operator A while the BS in the middle belongs to Operator B). The spectrum a from Operator A and the spectrum b from Operator B is defined as a shared spectrum and can be used by both Operators according to agreed policy rules. During Operation it may happen the spectrum a and b is used by the left and right BS of Operator A while Operator B doesn't need spectrum. Without coordination between the left and right BS the left BS may decide at a time to release Spectrum block a while the right BS decides at the same or another time to release spectrum block b. When the middle BS of Operator B requests additional spectrum there is no spectrum left for the area because spectrum a and spectrum b is blocked for this area, i.e. both spectrum blocks cannot be used without interfering either the left or the right BS of Operator A.

In general spectrum sharing increases while spectrum fragmentation decreases the spectrum efficiency within an area, i.e. in a spectrum sharing scenario it is necessary to find a solution which at least limits spectrum fragmentation to get best spectrum efficiency.

Another drawback is given by the requested mobility in mobile radio networks which is based upon HOs between neighbouring cells of the RAN. A fragmentation of the cells will lead to a change in basic parameters e.g. carrier frequency and/or bandwidth between neighbouring base stations of the same operator. Therefore, fragmentation will lead to an 'expensive' handover between different carriers or even RATs which should be avoided. In particular required measurements of the mobile on additional frequency carriers could be avoided. Keeping the spectrum allocation between neighbouring cells almost identical allows to base the HO in a cognitive network on a 'classical' and efficient intra carrier intra RAT HO.

Current definitions in 3GPP allow to share Radio Networks between Operators (e.g. MORAN, MOCN, Roaming) but none of this existing concepts deal with spectrum sharing. Either an Operator owned spectrum is shared with other Operators (Roaming and MOCN) or the Radio Base Station supports multiple Operators with dedicated spectrum for each Operator (MORAN).

Moreover, current definitions in IEEE and ITU-T don't provide detailed mechanisms on spectrum sharing among operators. In particular no scheme is defined or supported which avoids the fragmentation of spectrum during the spectrum release and expansion process.

SUMMARY OF THE INVENTION

Embodiments of the present invention aim to allow a more efficient use of spectrum blocks in shared radio access networks.

According to a first aspect of embodiments of the present invention, this is accomplished by an apparatus comprising
  a processor configured to determine a fragmentation probability which indicates a probability of fragmentation of frequency resources in at least one network section for at least one network operating entity.
Further, the processor may be configured to determine the fragmentation probability based on dependencies between cells in the network section.
Further, a plurality of basic scenarios for dependencies of a cell to other cells may be defined, and the processor is configured to determine the fragmentation probability by referring to the basic scenarios.

Further, the processor may be configured to determine a fragmentation probability for each network operating entity separately.

Further, the processor may be configured to allocate and/or de-allocate frequency resources to network operating entities based on the determined fragmentation probability.

Further, the processor may be configured to define priorities of frequency resources for a network operating entity individually, and to allocate and/or de-allocate frequency resources based on the priority and on the fragmentation probability.

According to a second aspect of embodiments of the present invention, a method is provided which comprises determining a fragmentation probability which indicates a probability of fragmentation of frequency resources of at least two operators in at least one network section for at least one network operating entity.

Further, the method may comprise determining the fragmentation probability based on dependencies between cells in the network section.

Further, a plurality of basic scenarios for dependencies of a cell to other cells may be defined, and the method may comprise determining the fragmentation probability by referring to the basic scenarios.

Further, the method may comprise determining a fragmentation probability for each network operating entity separately.

Further, the method may comprise allocating and/or de-allocating frequency resources to network operating entities based on the determined fragmentation probability.

Further, the method may comprise defining priorities of frequency resources for each network operating entity individually, and allocating and/or de-allocating frequency resources based on the priority and on the fragmentation probability.

According to a third aspect of embodiments of the present invention, an apparatus is provided which comprises a processor configured to allocate and/or de-allocate frequency resources in a at least one network section, to define priorities of frequency resources for a network operating entity individually wherein fragmentation probability information may be used to define the priorities, and to allocate and/or de-allocate the frequency resources for the at least one network operating entity based on the priorities.

Further, the processor may be configured to define a start frequency resource for the at least one network operating entity, and to define a highest priority for the start frequency resource for the for the at least one network operating entity.

Further, the processor may be configured to define priorities for subsequent frequency resources neighbouring the start frequency source with priorities in descending order.

Further, the processor may be configured to define priorities for frequency resources based on one or more of the following rules:

a neighbour frequency resource is given higher priority than other frequency resources, and/or a neighbour frequency resource in a group of subsequent frequency resource which are not allocated is given a higher priority, and/or for neighbour frequency resource groups of subsequent frequency resources having the same length, fragmentation probability is used to define the priority, and/or a direction of giving priorities to frequency resources is fixed until no more free frequency block is available or the direction is determined based on said rules.

Further, the processor may be configured to give priority to frequency resources owned by a network operating entity when allocating frequency blocks to this network operating entity.

Further, the processor may be configured to allocate a frequency resource with a high priority first, and/or to de-allocate a frequency resource with low priority first.

Further, the processor may be configured to adapt the allocation and/or de-allocation of frequency resources based on network conditions.

Further, the processor may be configured to adapt the start frequency resource for the at least one network operating entity based on network conditions.

The frequency resources may contain frequency blocks having a size defined by a frequency range.

Further, the processor may be configured to adapt sizes of the frequency blocks based on the network conditions.

Further, the processor may be configured to receive network measurement results from the network and to determine the network conditions based on the network measurement results.

According to a fourth aspect of embodiments of the present invention, a method is provided which comprises allocating and/or de-allocating frequency resources in at least one network section, defining priorities of frequency resources for at least one network operating entity individually wherein fragmentation probability information is used in defining the priorities, and performing allocating and/or de-allocating of the frequency resources for the at least one network operating entity based on the priorities.

Further, the method may comprise defining a start frequency resource for each the at least one network operating entity, and defining a highest priority for the start frequency resource for the at least one network operating entity.

Further, the method may comprise defining priorities for subsequent frequency resources neighbouring the start frequency source with priorities in descending order.

Further, the priorities for frequency resources may be defined based on one or more of the following rules:

a neighbour frequency resource is given higher priority than other frequency resources, and/or a neighbour frequency resource in a group of subsequent frequency resource which are not allocated is given a higher priority, and/or for neighbour frequency resource groups of subsequent frequency resources having the same length, fragmentation probability is used to define the priority, and/or a direction of giving priorities to frequency resources is fixed until no more free frequency block is available or the direction is determined based on said rules.

Further, the method may comprise giving priority to frequency resources owned by a network operating entity when allocating frequency blocks to this network operating entity.

Further, the method may comprise allocating a frequency resource with a high priority first, and/or de-allocating a frequency resource with low priority first.

Further, the method may comprise adapting the start frequency resource for the at least one network operating entity based on network conditions.

Further, the frequency resources may contain frequency blocks having a size defined by a frequency range.

Further, the method may comprise adapting sizes of the frequency blocks based on the network conditions.

Further, the method may comprise receiving network measurement results from the network and determining the network conditions based on the network measurement results.

The network section according to the aforementioned aspects of embodiments of the present invention may comprise a complete radio access network or subset of a radio access network including at least one cell.

The frequency resources according to the aforementioned aspects of embodiments of the present invention may be in a same frequency band or in different frequency bands, and/or are in different radio access technologies.

Thus, by determining a fragmentation probability and by defining priorities of frequency sources, it is possible to a more efficient use of spectrum blocks in networks such as shared radio access networks.

Advantageous developments are defined in the dependent claims.

Furthermore, according to a fifth aspect of embodiments of the present invention, a computer program product is provided which comprises code means for performing a method according to any one of the second and fourth aspects described above and their variations, when run on a processing means or module. The computer program product may be embodied on a computer-readable medium.

BRIEF DESCRIPTION OF THE DRAWINGS

These and other objects, features, details and advantages will become more fully apparent from the following detailed description of embodiments of the present invention which is to be taken in conjunction with the appended drawings, in which:

FIGS. 2 and 3 illustrate examples for shared networks.

DETAILED DESCRIPTION OF EMBODIMENTS

In the following, description will be made to embodiments of the present invention. It is to be understood, however, that the description is given by way of example only, and that the described embodiments are by no means to be understood as limiting the present invention thereto.

Figure 1:
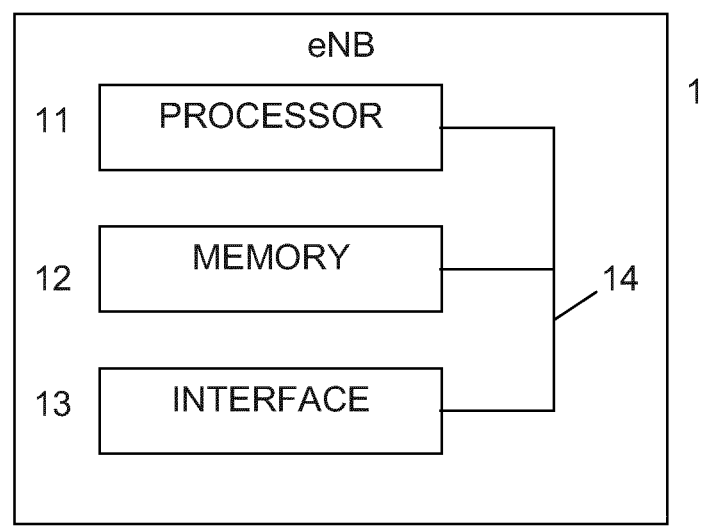
FIG. 1 shows a simplified block diagram of an apparatus according to embodiments of the present invention.

In the following, some general descriptions of principles of embodiments of the present invention are given by referring to an example for an apparatus according to an embodiment of the present invention as shown in FIG. 1. This apparatus may be included in a spectrum configuration device of a network, for example. FIG. 1 illustrates a simplified block diagram of the apparatus.

The apparatus comprises a processor 11 which is configured to determine a fragmentation probability which indicates a probability of fragmentation of frequency resources in at least one network section for at least one network operating entity.

Optionally, the apparatus may comprise an interface 12 connectable to the network by which signalling with other elements is enabled. Moreover, the apparatus comprises a memory 13, in which programs for carrying out the functions according to the embodiments are stored. The processor 11 and the memory 13 may be inter-connected by a suitable connection 14, e.g., a bus or the like.

A method according to an embodiment of the present invention comprises determining a fragmentation probability which indicates a probability of fragmentation of frequency resources in at least one network section for at least one network operating entity.

Thus, according to embodiments of the present invention, a fragmentation probability in a network for at least one network operating entity is determined. Based on this fragmentation probability, an allocation of frequency resources to operators may be performed, for example.

Alternatively, the processor 11 of the apparatus shown in FIG. 1 may be configured to allocate and/or de-allocate frequency resources in at least one network section, to define priorities of frequency resources for a network operating entity individually, and to allocate and/or de-allocate the frequency resources based on the priorities.

An alternative method of embodiments of the present invention may comprise allocating and/or de-allocating frequency resources in at least one network section, defining priorities of frequency resources for a network operating entity individually, and performing the allocation and/or de-allocation of the frequency resource based on the priorities.

Hence, according to certain embodiments of the present invention, frequency resources are allocated or de-allocated to an operator based on priorities which are defined for each network resource for each operator.

The fragmentation probability may depend on overlapping between different network parts, and, thus, may be a degree for mutual disturbances between such network parts. When there is no overlapping, there may be no fragmentation probability (e.g., the fragmentation probability may be 0), and in case of a high number of overlapping network parts, the fragmentation probability may be near 1 in the worst case.

In more concrete examples described below, the fragmentation probability is determined by referring to basic scenarios, in which fragmentation probabilities for typical cases of overlapping cells are defined, and based on which fragmentation probabilities for more complex arrangements can be determined by combining the basic scenarios.

The network section mentioned above may include a whole radio access network of at least one network operating entity, or only a part thereof, for example only a single cell. The network section may be a shared network which is shared by at least two network operating entities.

An network operating entity used in this context may be defined as:
- A single operator which operates a part of the radio access network in the network section.
- An organizational unit of an operator which operates a defined part of a radio access network which consists of either a specific class of a radio access network (e.g. Macro, Micro, Pico, Femto, . . . ) or a specific radio access network technology in the network section.

For example, a first organizational unit of an operator may operate one or more macro cells, whereas a second organizational unit of this operator may operate one or more femto cells in the network section.

Moreover, the principles described above may also be applied for example to a case in which a network is shared between two different network operating entities of the same operator (e.g., two organizational units of the same operator) which share a network section.

The frequency resources may be frequency blocks, which may be defined as a certain frequency range having a start frequency and an end frequency. In the following, the frequency blocks are also referred to as spectrum blocks or spectrum sub blocks.

In the following, principles according to embodiments of the present invention are described in more detail.

In the following embodiments, the case is assumed that the network operating entities are separate operators. However, the same principles are also applicable for the case as defined above in connection with the network operating entities.

As described above, it is necessary to understand that spectrum fragmentation needs to be avoided to increase the efficiency of the available spectrum usage and to avoid unnecessary inter frequency and/or inter RAT Handovers. In a more general way, the fragmentation itself is influenced by following parameters:

1. Number of Operators (or network operating entities, as defined above) which share a spectrum block within a specified area. The National Regulation Authority or at least one Operator has to provide the spectrum, spectrum from more or all Operators may also be provided for sharing.

2. Amount and granularity of spectrum blocks which are used for sharing. The spectrum blocks may be in different frequency bands and may also be in different frequency blocks within a frequency band. Spectrum blocks are provided by Operators or directly by the National Regulation Authority. Each spectrum block may also be divided in sub-blocks with finer granularity.

3. Number and granularity of areas where a specific spectrum block may be used for sharing at a specified time period. The area includes the Base Stations of all Operators which are involved in the spectrum sharing process. The granularity level of an area should include also finer levels like regions, sub-regions as small as a single Base Station location of a single Operator.

Based on the numerous options given by these parameters the term scenario is introduced. A scenario specifies the amount and granularity of shared spectrum blocks for a specific area and the number of Operators which share the spectrum in this area. A scenario may exist for each single cell or for larger areas with several cells or countrywide including all cells forming the »shared network« (i.e. the network which shares the spectrum blocks).

Spectrum blocks may be in the same frequency band or from different frequency bands. When spectrum blocks are in the same frequency band they can be seen as equal while spectrum blocks in different frequency bands may have different valences for Operators. Each spectrum block may be owned by an Operator with preference to use the own block before other shared blocks or may be without ownership with equal sharing of all blocks. Additionally spectrum blocks may be split in several sub-blocks where each sub block may be split again in further sub blocks, but at least one spectrum block is needed for sharing.

In a further step the dependencies between each base station to all other base stations and each Operator to all other Operators are defined in the defined scenario. This is done by introducing a set of new parameters »fragmentation probability« which defines the probability of spectrum fragmentation for:
- a defined scenario or sub scenarios forming the scenario
- a cell which equals to a base station or to be more precise
  - a sector of a base station (typically a base station may be sectored and each sector build an independent cell)
- an Operator The fragmentation probability varies between 0 and 1, the best and worst achievable value for a specific scenario where the best value equals to the lowest fragmentation respectively the highest spectrum usage efficiency. With these definitions for scenarios and fragmentation probabilities it will be possible to define general methods and rules to avoid fragmentation during the allocation and de-allocation of spectrum. Another aspect is that these rules should preferably follow basic Cognitive Radio principles for dynamic spectrum allocation DSA. Therefore a startup solution and a learning/optimization function is needed. The main concept to cover these additional aspects is to introduce a mechanism for static determined spectrum allocation and de-allocation rules for the start up and to combine this solution with CRN methods to a dynamic determined spectrum allocation and de-allocation process.

1. Scenario Definitions for Spectrum Sharing

The easiest way is to define a scenario for an area which covers all cells of all participating Operators. A further option is to split this scenario into several sub-scenarios with smaller areas. The splitting may go down to a level where a single cell defines the area for the sub-scenario. Finer granularity allows further spectrum usage optimizations but increases in return more expensive HOs for each Operator. Therefore the number of sub-scenarios should be limited to a reasonable number of sub-scenarios to balance between spectrum usage optimizations and expensive HOs. The main idea is to start with an overall scenario (covering all cells of all Operators) and to use network measurements to split this scenario into sub-scenarios to find the best spectrum usage at an acceptable number of expensive HOs.

The following sub-chapters describes the rules, methods and principles to be used for optimization of spectrum allocation and de-allocation.

2. Static determined spectrum allocation and de-allocation rules

Figure 4:
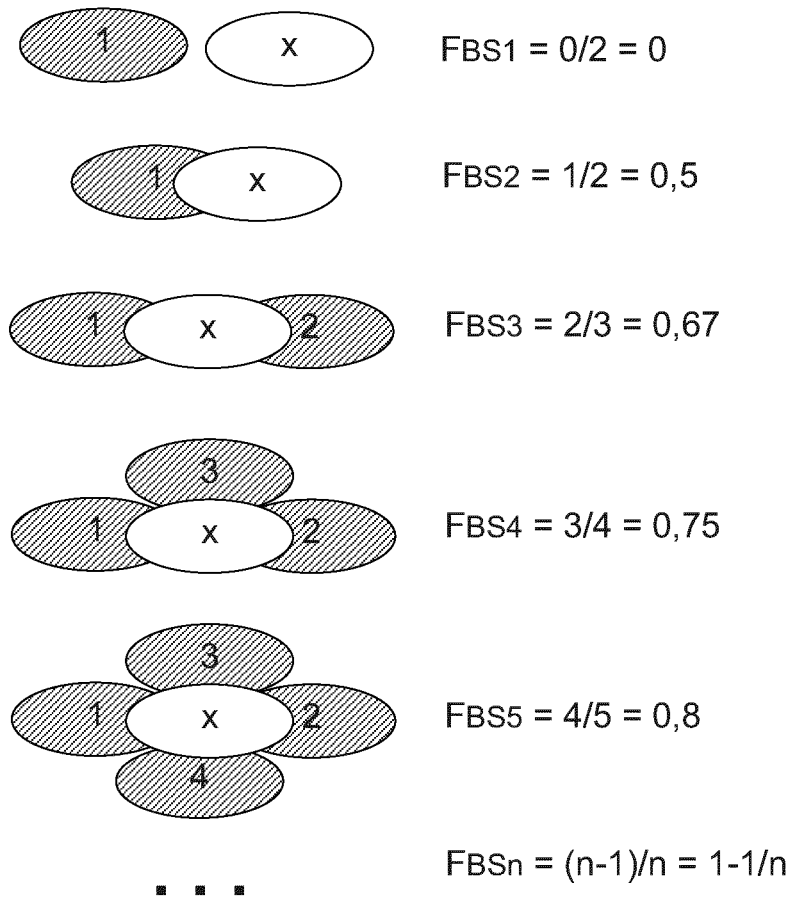
FIG. 4 shows examples for determining fragmentation probabilities for basic scenarios according to embodiments of the present invention.

A set of basic scenarios is defined which describes the dependency of a single cell »x« to a defined number of neighbour cells. Each basic scenario is unique but could be used to split every complex scenario into a combination of basic scenarios. FIG. 4 describes the basic scenarios and the related fragmentation probability.

The fragmentation probability $F_{BSn}$ for a basic scenario is directly related to the complexity of a basic scenario where higher values stand for more complexity and a higher fragmentation probability. The fragmentation probability $F_{scenario}$ for a complex scenario is defined as sum of identified basic scenario fragmentation probability for each cell which belongs to the complex scenario. The principle is shown in FIG. 5, where all possible scenario cases for 4 cells is described.

For example, in the case of Fs2, it can be seen that for the cells 1 and 3 the basic scenario shown in the second row of FIG. 3 applies (FBS=½), and for the cells 2 and 3, the basic scenario shown in the first row of FIG. 3 applies (FBS=0). Considering all dependencies of the cells on each other, this leads to $(½+0+½+0)/4=⅛+0+⅛+0=¼$.

An important aspect for the usage efficiency of a spectrum block is that contiguous spectrum sub-blocks have a lot of advantages compared to dispersed sub-blocks, i.e. the allocation and de-allocation process should guarantee that the sub-blocks are chained as long as possible for each Operator.

Figure 5:
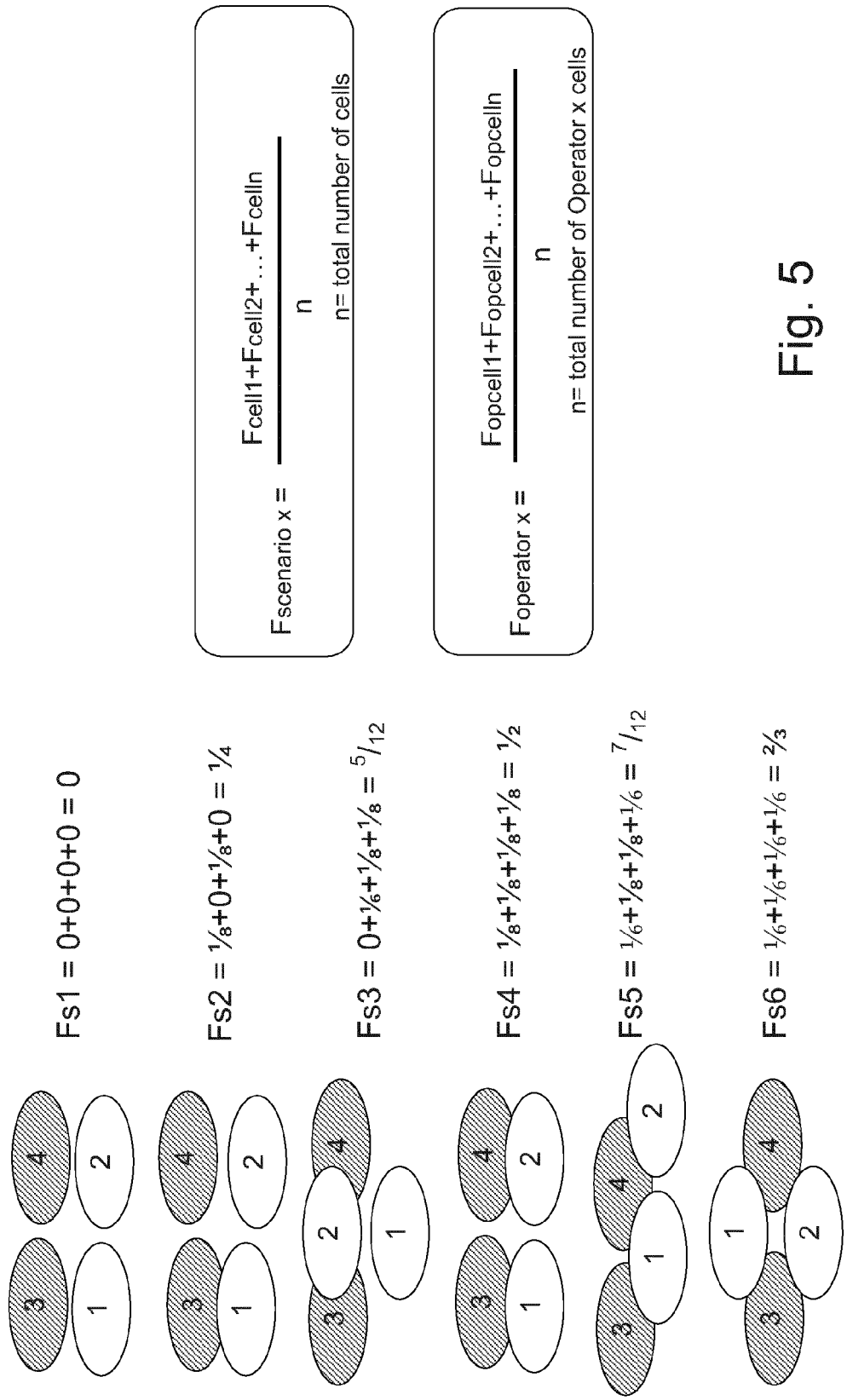
FIG. 5 shows examples for determining fragmentation probabilities for complex scenarios based on the fragmentation probabilities for the basic scenarios shown in FIG. 4 according to embodiments of the present invention.

For spectrum sharing scenarios the fragmentation probability for each Operator $F_{Operator}$ is calculated according to FIG. 5. The fragmentation probability for each Operator $F_{Operator}$ is determined based on the cells owned by the operators.

Figure 6:
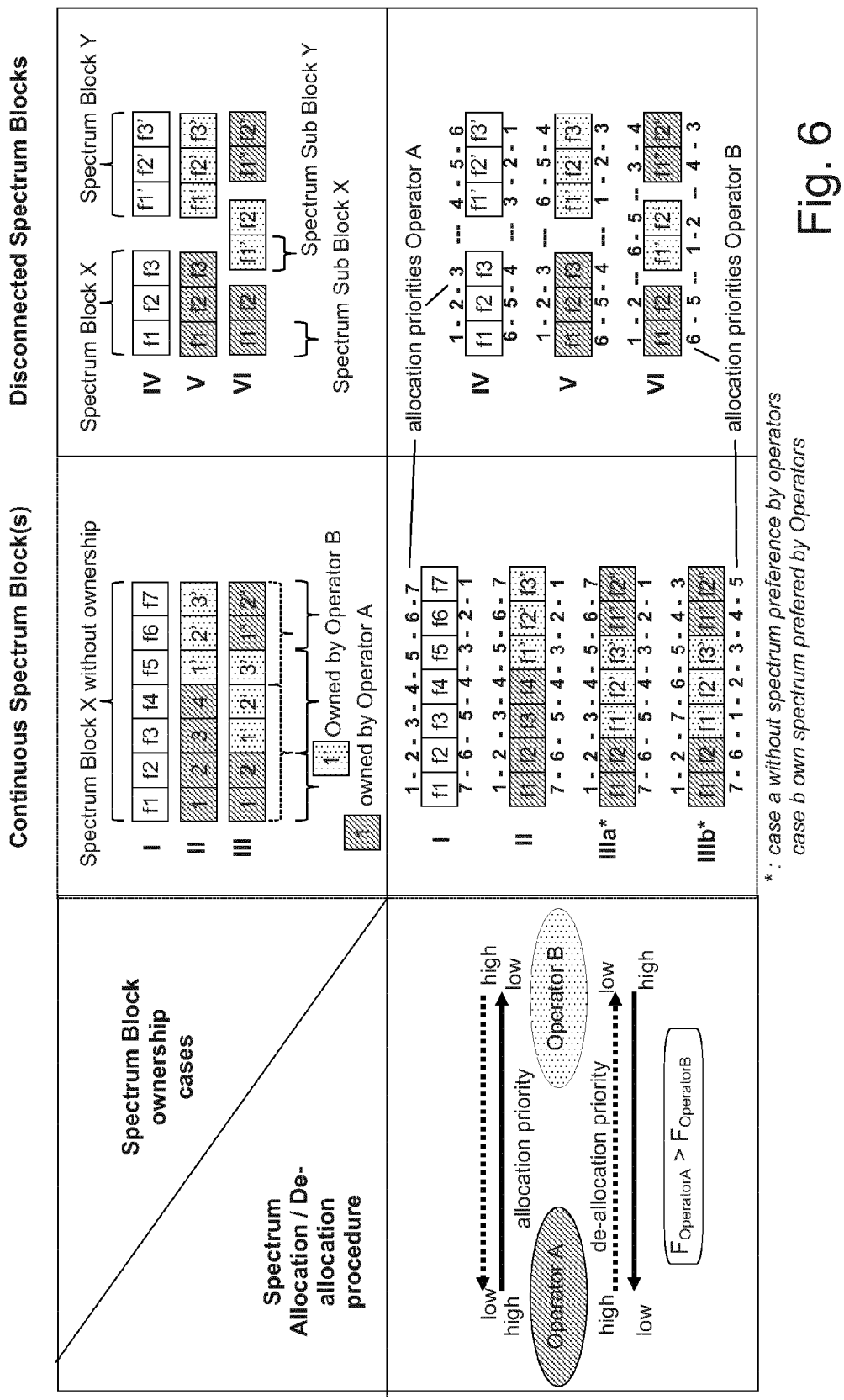
FIG. 6 shows allocation/de-allocation procedures according embodiments of the present invention.

This fragmentation probability $F_{Operator}$ is then used to optimize the spectrum usage, where the usage is defined by the allocation and the de-allocation of spectrum. For 2 Operators (A and B) the solution may be that Operator A (the Operator with higher $F_{Operator}$ value) starts allocation from one end (=sub-block with lowest frequency block) the other Operator (Operator with lower $F_{Operator}$ value) from the other end (=sub block with the highest frequency block) or vice versa. Each following allocation requests will select the neighboured sub-block until all sub-blocks are assigned to the Operators and no spectrum is left. Spectrum de-allocation follows the same rules but in reverse order, i.e. always the last allocated sub-block will be released before other sub-blocks (last in-first out principle). FIG. 6 shows possible allocation/de-allocation procedures for continuous spectrum blocks and for disconnected spectrum blocks, i.e. blocks with spectrum gaps.

In FIG. 6 different examples in connection with continuous spectrum blocks (second column) and disconnected spectrum blocks (third column are shown. In the figure, blank blocks indicate spectrum blocks without ownership, hatched blocks indicate blocks owned by operator A, and dotted blocks indicate blocks owned by operator B.

The first row in FIG. 6 indicates spectrum block ownership cases. Case I indicates different spectrum sub blocks indicated by f1 to f7. Case II indicates an example where the blocks indicated by 1 to 4 are owned by operator A, whereas the blocks indicated by 1' to 3' are owned by operator B. Case III indicates an example where the blocks indicated by 1 and 2 and 1" and 2" are owned by operator A, whereas the blocks indicated by 1' and 2' are owned by operator B. Cases IV to VI relate to disconnected spectrum blocks. In particular, case IV indicates different spectrum sub blocks indicated by f1 to f3 in a first spectrum block X, and different spectrum sub blocks indicated by f1' to f3' in a first spectrum block Y without ownership. Case V indicates that the spectrum sub blocks f1 to f3 in spectrum block X are owned by operator A, and the spectrum sub blocks f1' to f3' in spectrum block Y are owned by operator B. Case VI indicates that blocks f1 and f2 in spectrum block X and blocks f1" and f2" in spectrum block Z are owned by operator A, and blocks f1' and f2' in spectrum blocks Y are owned by operator B.

In the second row, the allocation priorities for the operators A and B are shown, which are indicated for operator A above the corresponding blocks, and for operator B below the corresponding blocks for all cases I to VI. The allocation/de-allocation priority directions for the operator A are indicated by an arrow with a solid line and for the operator B by an arrow with a dotted line. For example, in cases 1 to VI, the spectrum sub block f1 has the highest priority (1) for operator A, and the lowest priority (7 or 6) for operator B.

There is a chance that the combination of spectrum blocks owned by different Operators (A and B in FIG. 6) build a continuous spectrum block and the Operators agree to a general rule that own spectrum has to be preferred before allocating other Operator spectrum (case IIIb in FIG. 6). In this case the spectrum sub-block chaining is not as good as in FIG. 6 case IIIa but the described invention even works and avoids fragmentation of the shared spectrum.

Based on the former statement that spectrum blocks may be in different or same frequency bands it may happen (case III) that the joint spectrum forms a single spectrum block or (case VI) different spectrum blocks, i.e. f1" and f2" forms another block Z.

There might also be another case not mentioned because it is a combination of a continuous spectrum block case and a disconnected spectrum block case. Let's call this the new case VII. In case VII f1+f2 of Operator A and f1'+f2' from Operator B form a continuous spectrum block while f1"+f2" of Operator A is still disconnected.

For scenarios with more than 2 spectrum blocks the same rules for prioritization of spectrum allocation and de-allocation are used, i.e. the priority for allocation and reverse priority for de-allocation of spectrum blocks to support optimal spectrum block chaining for each Operator cell.

Figures 7A, 7B:
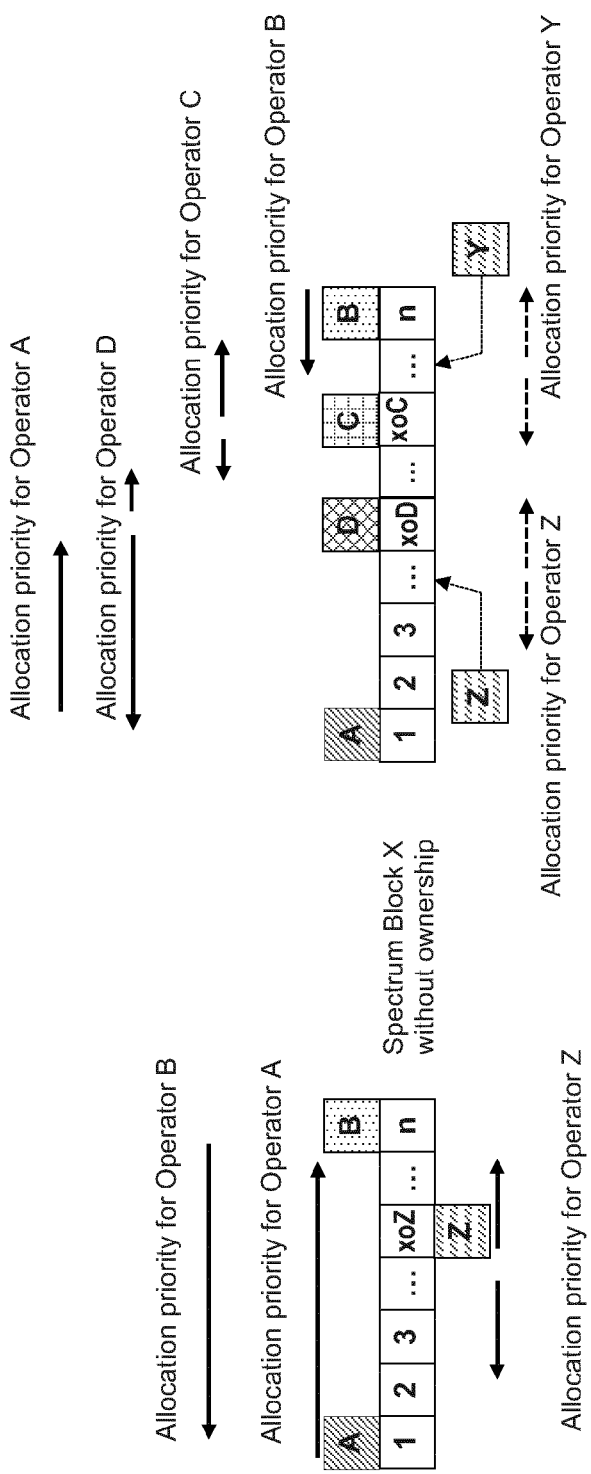
FIGS. 7A and 7B show allocation/de-allocation procedures for three and four operators according to embodiments of the present invention, respectively.

For scenarios with more than 2 Operators the fragmentation probability for each Operator $F_{Operator}$ is calculated for a scenario according to FIG. 5. This fragmentation probability $F_{Operator}$ is then again used to optimize the spectrum usage (see FIG. 7). FIG. 7A shows an example with three operators, whereas FIG. 7B shows an example with four and more operators.

In FIG. 7, the following reference characters indicate:
A: Operator with highest fragmentation factor $F_{OpA}$ (=highest fragmentation probability in scenario)
B: Operator with $2^{nd}$ highest fragmentation factor $F_{OpB}$ (=$2^{nd}$ highest fragmentation probability in scenario)
C: Operator with smallest fragmentation factor $F_{OpC}$ (=$3^{rd}$ highest fragmentation probability in scenario)
D: Operator with $2^{nd}$ smallest fragmentation factor $F_{OpD}$ (=$4^{th}$ highest fragmentation probability in scenario)
Y: Operator with $X^{th}$ smallest fragmentation factor $F_{OpY}$ (=smallest fragmentation probability in scenario)
Z: Operator with smallest fragmentation factor $F_{OpZ}$ (=smallest fragmentation probability in scenario)

The principle is to provide contiguous chained spectrum sub-blocks without introducing disadvantages for participating Operators. The two Operators with the highest $F_{Operator}$ values (Operator A and B) start allocation from the smallest spectrum sub block respectively highest spectrum sub block and give always neighboured sub-blocks higher priority than other sub-blocks. The other Operators start allocation from a calculated spectrum sub block $xo_{Operator}$ (e.g. XoC for Operator C or XoD for Operator D) and give again neighboured sub-blocks higher priority than other sub-blocks. Typically these other Operators have neighbour sub blocks in 2 directions, but they have to built also allocation priorities. Allocation priority may be based on following rules:
  Neighbour spectrum sub blocks have higher priority than other sub-blocks
  Neighbour spectrum sub blocks with longer not allocated sub block chain length have higher priority than other sub blocks
  Neighbour spectrum sub blocks with same not allocated sub block chain length will use the $F_{Operator}$ value to choose the priority (e.g. spectrum sub block in direction of Operator A or Operator B)

Before changing the allocation direction the direction is fixed until no more free sub block is available or alternatively the allocation direction is calculated new after every allocation of a neighboured spectrum sub block using the above described rules In case that more than 2 Operators are found in the group with the two highest $F_{Operator}$ values a random selection of Operators or additional information (e.g. Operator with the highest single $F_{OpCell}$ value, long term measurement and statistical data) are used to select the Operators for this group. The same mechanism may be used to select the sequence of operators in the group of smallest $F_{Operator}$ values.

In case that no more spectrum sub block is available other sub blocks of other available shared spectrum blocks may be used. Again this allocation follows the rules for allocation and de-allocation priorities.

The calculation of the spectrum sub block for an Operator $xo_{Operator}$ (spectrum sub block with highest allocation priority) may depend on following criteria:

Static calculation to support maximum number of spectrum block chaining for each Operator cell (depends on number of Operators and number of shared spectrum sub blocks)

Minimizing or optimizing or maximizing the spectrum blocks available between the xo spectrum blocks (see FIG. 7A, right part, spectrum blocks between xoC and XoD). The optimization could be seen as reserved blocks between Operator C and Operator D which cannot be used by Operator A or B or Y or Z) and depend on long term cognitive radio measurements In case that too many Operators have to share spectrum blocks the Operators should be distributed to different spectrum blocks, i.e. only a selected number of Operators use spectrum block a while the other Operators use spectrum block b. The best fitting Operator selection criteria for these spectrum block usage groups is again the fragmentation probability $F_{Scenario}$ for a scenario or $F_{Operator}$ for the changed scenarios. This is necessary because by changing the numbers of Operators the scenario is changed as well. As a general rule the spectrum blocks should have similar valence for the involved Operators. If this is not possible additional criteria (e.g. more spectrum sub blocks in less valuable spectrum block or commercial compensation) may be offered.

According to an alternative aspect of embodiments of the present invention, the mechanism described in FIG. 7 may be reversed, i.e. the 2 Operators with the smallest fragmentation probabilities start allocation from the smallest spectrum sub block respectively highest spectrum sub block and give always neighboured sub-blocks higher priority than other sub-blocks, etc.

Even in very complex scenarios it makes sense to start with an initial start-up setup. This is done by defining the starting spectrum sub block xoA for Operator A and xoB for Operator B (highest $F_{Operator}$ values) as described above. Further 2 Operators are placed in the mathematical middle of these spectrum blocks (Total number of sub blocks divided by 2) xoC and xoD. Further Operators are again defining the starting spectrum sub blocks in the mathematical middle of the 2 Operator spectrum blocks (see FIG. 7). The allocation priority for each Operator will be highest beginning with the $xo_{Operator}$ sub block and follows the principle as shown in FIG. 6. Based on this initial start-up setup Cognitive Radio Mechanisms or dynamic determined spectrum allocation and de-allocation rules may be used to further optimize the static determined spectrum usage process.

In case that the spectrum allocation and de-allocation is better organized than on Operator level further optimizations on spectrum usage efficiency will be possible. For example cells with a fragmentation probability $F_{Cell}=0$ do not influence other cells and may use the full spectrum even if the spectrum is used by other cells of the same or other Operators. As a general rule the Network of the involved Operators needs to be analyzed to identify best fitting scenario definitions, i.e. large networks consisting of several Operator Networks are split to a set of scenarios. Best fitting scenario means to have scenarios with similar conditions, especially similar $F_{Scenario}$ values (calculation according to definition in FIG. 5) and with similar $F_{Operator}$ values because this allows to reuse the static determined spectrum allocation and de-allocation rules for all scenarios (i.e. the complete shared spectrum network).

3. Dynamic Determined Spectrum Allocation and De-Allocation Rules

Based on the static determined allocation and de-allocation rules measurements and performance evaluations from the involved RANs are used to fine tune these rules. Especially when 3 or more Operators are involved the feedback from the RANs are used to adapt the $xo_{Operator}$ spectrum sub block within a spectrum block. Additionally the feedback may be used to appoint reserved spectrum sub blocks (these are the blocks between two $xo_{Operator}$ values in scenarios with more than 4 Operators, see xoC and xoD in right example of FIG. 7). The advantage of the feedback system is that the fine tuning is performed automatically while without this functionality the fine tuning has to be performed by means of manual configuration adaptations.

Additionally the measurements and performance evaluations from the involved RANs are used to identify and introduce possible scenario split options.

Figure 8:
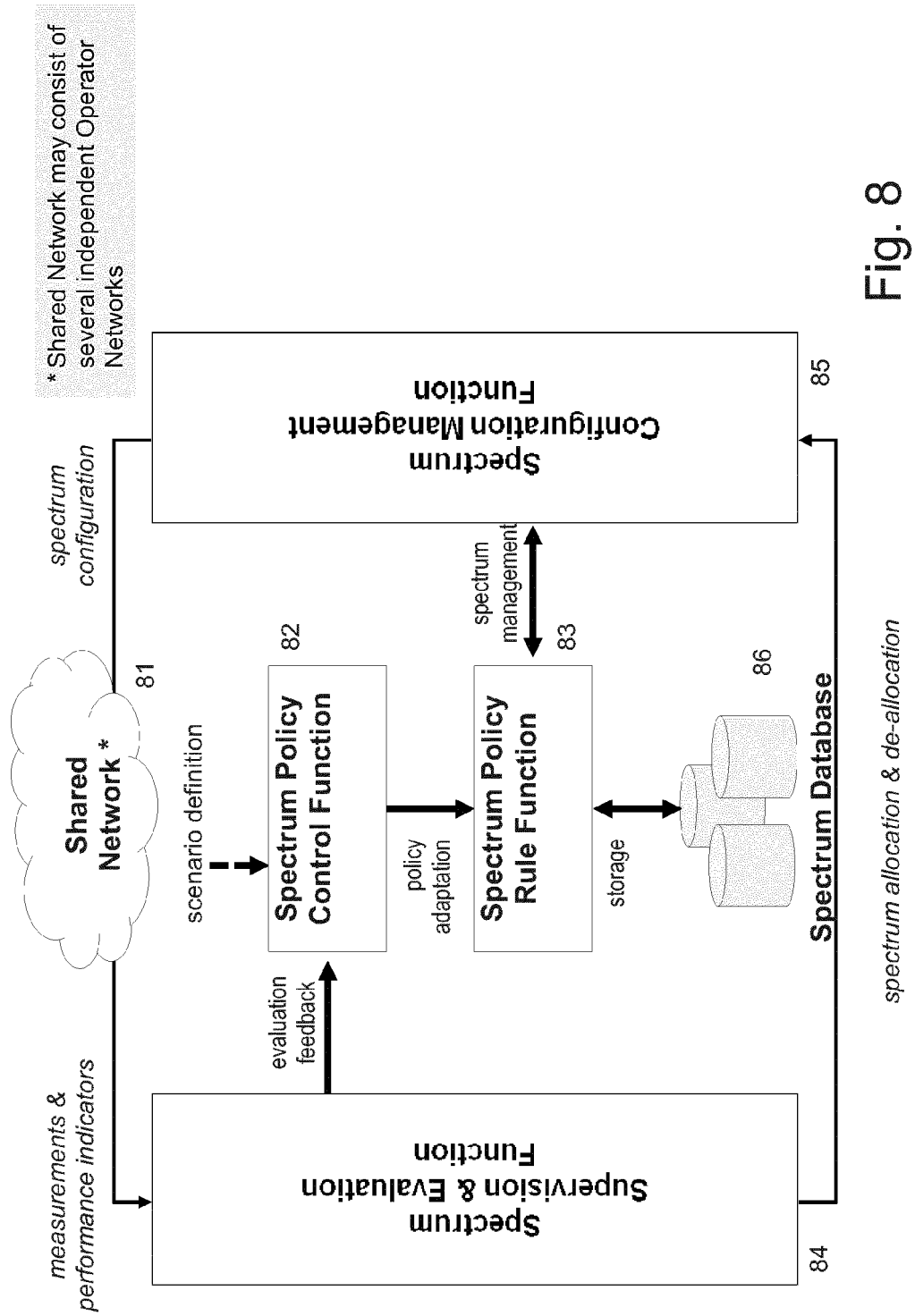
FIG. 8 shows a feedback control system for a dynamic allocation and de-allocation according to embodiments of the present invention.

FIG. 8 shows a feedback control system with a spectrum policy control function and a spectrum policy rule function as extension which is able to support statically and dynamically determined spectrum allocation and de-allocation rules.

In particular, a shared network 81, which may consist of several independent operator networks, is managed by the system. measurement and performance indicators from the shared network 81 are transmitted to a spectrum supervision and evaluation function 84, which in turn indicates spectrum allocation and de-allocation to a spectrum configuration management function 85, which sends spectrum configuration information to the shared network 81. Furthermore, a spectrum policy control function 82 receives evaluation feedback from the spectrum supervision and evaluation function 84, and performs a policy adaptation based on the evaluation feedback and on a scenario definition, which may change, as described above. Moreover, a spectrum policy rule function receives the policy adaptation and performs the spectrum management with the spectrum configuration management function 85. The spectrum policy rule function 83 may also refer to a spectrum database 86 for storage.

Thus, according to the present embodiment as shown in FIG. 8, the system is extended with new functionality which uses the spectrum policy control function and the spectrum policy rule function to coordinate the spectrum allocation and de-allocation. The functions themselves may be implemented in a Base Station, an OAM system managing the BS, a Core Network Node like MME or any other device located in the Management domain, Core Network Domain or Access Network domain of one or more Operators. Such a system may be centralized or decentralized within one ore more Operator Network domains.

Hence, for example, the apparatus 1 shown in FIG. 1 may be implemented in the spectrum policy control function 82 and/or the spectrum policy rule function 83, for example.

The extension to a CRN system is designed to cover all possible events which influences the efficiency of spectrum usage. The scenarios itself may be defined at a fine granularity level (e.g. there is a scenario definition for each single base station of involved Operators) or as a very coarse indicator (e.g. for a region or a country).

Another aspect is that the spectrum allocation and de-allocation may be based on calculated priority schemes using the fragmentation probability or on a simplified priority scheme. The first method is typically used in spectrum sharing scenarios with more than two Operators while the second method fits better in simple scenarios (e.g. only few spectrum blocks with no or a low number of sub block available) or scenarios with only two involved operators.

The following example shows how a simplified priority scheme may be used according to embodiments of the invention. A simple but effective method to minimize fragmentation of shared spectrum in participating Operator networks consists of a prioritization scheme per involved Operator used for the »release spectrum« (=de-allocate spectrum) and »expand spectrum« (allocate spectrum) process. The prioritization scheme is either preconfigured by means of an Operation and Maintenance process or is dynamically provided as part of the protocol used for expansion or release of the spectrum (e.g. request and accept messages).

The Base Station will allocate existing spectrum according to following rule: 'own' spectrum has a higher priority than foreign spectrum (see FIG. 9). This means that a Base Station from Operator A allocates first the complete spectrum 'a' before spectrum 'b, c, d, . . . z' is used while Operator B allocates first the spectrum 'b' before spectrum 'a, c, d, . . . z'. In case that several 'owned' spectrum blocks are available the complete owned group will have a higher priority than those of other operators. Further it shall be possible to issue sub-priorities to each owned and/or foreign spectrum block which allows a finer granularity to cover more complex spectrum steering mechanisms. Further it shall be possible to define that a specific sub-priority is reserved for a specific Operator or a group of Operators. Sub-priorities and their behaviour may be configured by means of static configurations or may be part of the cognitive process within the joint cognitive radio network formed by a number of Operators.

Note:
Assignment of priorities can be done on a global or local basis.
Assignment of the priorities could be organized by the spectrum owner e.g. operator or by national regulation authorities.
Exclusive usage could be assigned to a spectrum block, which allows for embedding of 'traditional' policies in the proposed scheme.

Based on measurements and performance indicators evaluation from the Shared Network, which may be formed by several independent Operator Networks the spectrum usage is supervised and allocated or de-allocated by the spectrum supervision & evaluation function according to a defined threshold scheme (e.g. traffic overload detected—allocate spectrum or low traffic load—de-allocate spectrum).

Spectrum allocation and de-allocation is performed by the spectrum management function which uses the spectrum policy rule function for optimizing the fragmentation probability for each »expand spectrum« and »release spectrum« procedure.

—Expand Spectrum—
Expansion shall be done according to the same rule: 'own' spectrum has a higher priority than foreign spectrum, i.e. as long as 'own' spectrum is available it will be allocated for expansion before foreign spectrum. In case that several spectrum blocks are available with sub-prioritization the allocation follows the same mechanism, higher sub-priority is allocated before lower sub-priority. This mechanism shall be valid for own and foreign spectrum (even if own spectrum is not available).

—Release Spectrum—
Release of spectrum shall be done appropriate to the expand mechanism, i.e. all foreign spectrum shall be released before release of 'own' spectrum. In case that sub-prioritization is supported, spectrum with lower sub-priority is released before spectrum with higher sub-priority. This mechanism shall be valid for own and foreign spectrum.

The functional blocks used in FIG. 8 may be split or combined in any combination to allow most flexible implementations in new or existing network nodes. This includes also the flexible distribution of function blocks or parts of function blocks to support any type of centralized, decentralized or mixed architectures for the fragmentation probability optimization.

The Spectrum Supervision and Evaluation Function provides evaluation feedback to the Spectrum Policy Control Function. The Spectrum Policy Control Function uses this feedback to check and calibrate the Fragmentation Rules for a scenario (dynamic determined spectrum allocation and de-allocation rules). The calibration may be based on statistical calculations based on actual and history data or on more sophisticated forecast functionality (e.g. trend analysis determined by feedback data).

This dynamic determined spectrum allocation and de-allocation rules extend the static determined rules as follows:
Variable spectrum sub block sizes. In this case it is necessary to introduce additional extensions at the spectrum management interface and the Spectrum Policy Rule function. The spectrum sub block chaining allows to reorganize spectrum sub blocks as long as the sub blocks are not in use. There are several options possible with the described coordinated allocation and de-allocation methods to add these extensions easily (e.g. reorganize sub blocks before allocation, reorganize sib blocks after de-allocation, etc.)
Support of dynamic scenarios, i.e. changing area size (splitting of a scenario), amount and granularity of spectrum blocks, number of Operators in an area
Combination of single scenarios to cover interference and spectrum usage optimizations with neighbourhood areas
Introduction of hierarchical scenarios to optimize spectrum usage on country, regional and Base Station specific levels
Minimizing the expensive HOs In a 'traditional' cognitive network the mobile is forced to permanently monitor huge frequency bands to identify optional spectrum which could be allocated. The required measurements are wickedly expensive in terms of required RF support and computational power whereas both of them are leading to an reduced UE battery lifetime. The proposed priority scheme offers the opportunity to significantly reduce the bandwidth of the monitored spectrum since it defines a 'next to take' spectrum block. Thus, reducing the monitoring efforts from N potential spectrum block candidates to one single 'next' spectrum block. Moreover, signalling according to measurements and spectrum allocation/de-allocation could be significantly reduced due to the implicit knowledge of the addressed spectrum block.

In the following, more detailed embodiments implementing the principles described are described by referring to FIGS. 10 and 11.

Figures 9, 10:
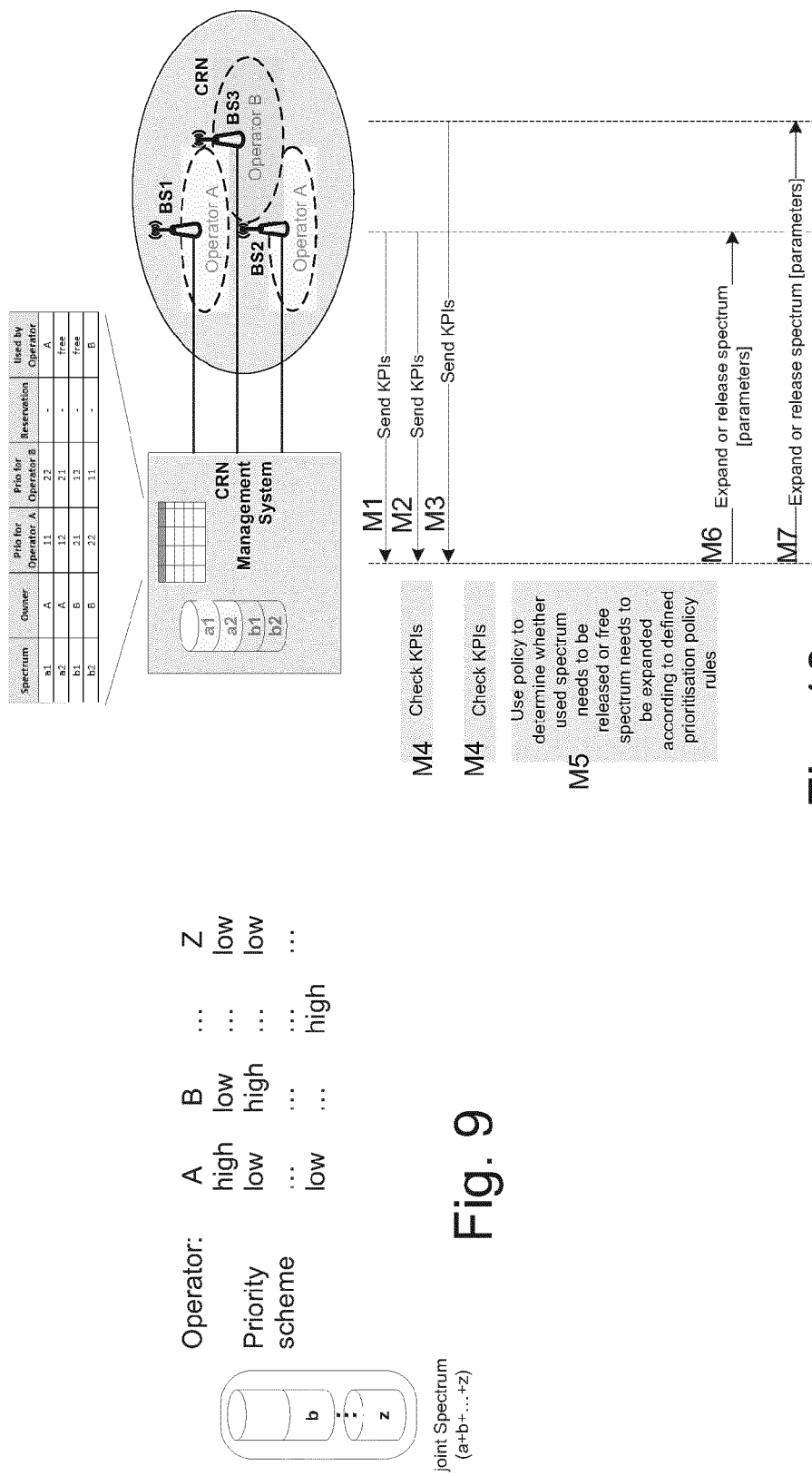
FIG. 9 illustrates a simplified priority scheme according to embodiments of the present invention.
FIG. 10 shows a spectrum sharing scenario according to embodiments of the present invention.

FIG. 10 shows a spectrum sharing scenario according to an embodiment of the present invention. The sharing scenario may describe a single mobile network operator with a organization unit A operating a LTE Femto Network and a organization unit B operating a LTE Macro Network or two independent mobile networks forming a network section. Each mobile network is operated by an Operator, i.e. the first network is operated by Operator A and the second network by operator B. Common to both cases is the sharing of radio spectrum.

Operator A and Operator B decide to form a joint Cognitive Radio Network CRN. Each Operator provides Base Stations (Operator A Base Station BS1 & BS2 and Operator B BS3) and 3 spectrum blocks a0, a1, a2 owned by Operator A and b0, b1, b2 owned by Operator B. The spectrum blocks shall be shared between both Operators. Operator A reserves a0 for exclusive usage and Operator B reserves b0 for exclusive usage. The cell formed by BS3 overlaps the cells of BS1 and BS2, i.e. the shared spectrum needs to be managed in a way to avoid interference between BS1/BS2 and BS3. Based on the avoidance of interference there is a high risk that spectrum fragmentation occurs. The spectrum is managed via a CRN Management System which implements the function blocks »Spectrum Supervision & Evaluation Function«, »Spectrum Configuration Management Function«, »Spectrum Policy Control Function«, »Spectrum Policy Rule Function« and the »Spectrum Database« as defined in FIG. 8. The shared Network is built of 2 Operator Networks from Operator A and Operator B. The measurement and performance data are sent by the according Base Stations BS1, BS2 and BS3 to the CRN Management System.

The CRN Management System stores a table (FIG. 6) which contains following information used for steering of the shared spectrum, as shown in the following table 1:

TABLE 1

| Spectrum | Owner | Prio for Operator A | Prio for Operator B | Reservation | Used by Operator |
|---|---|---|---|---|---|
| a0 | A | — | — | A | A |
| a1 | A | 11 | 22 | — | A |
| a2 | A | 12 | 21 | — | free |
| b0 | B | — | — | B | B |
| b1 | B | 21 | 12 | — | free |
| b2 | B | 22 | 11 | — | B |

The priority scheme consists of 2 classes and is configured statically. The first class defines 'own' and foreign spectrum the other class prioritizes the spectrum blocks of the owned and foreign class. Spectrum a0 and b0 is not shared but exclusively used by the Operators. Each Operator has 4 priorities 11, 12, 21 and 22 where lower numbers stands for higher priority, i.e. 11 defines the highest priority and 22 the lowest priority. Reserved (exclusive usage) by A or B means that the spectrum cannot be used by the other Operator (Spectrum a0 is not available for Operator B and b0 is not available for Operator A), i.e. both are not included in the priority scheme. The last column is used to mark whether the spectrum block is currently available (free) or used by Operator A or B. Additional information may be stored in the table as well (e.g. which Base Station uses the spectrum).

The Base Stations (BS1 to BS3 in FIG. 10) of Operator A and Operator B send Key Performance Indicator KPI data to the CRN Management System (as shown in M1 to M3). The CRN Management System receives the KPI data and checks the KPIs (M4). Furthermore, the CRN Management System uses these KPI data to determine whether used spectrum needs to be released or free spectrum needs to be expanded according to defined policy rules represented by the prioritisation scheme (M5). As indicated by M6 and M7, corresponding expand commands or release commands are sent to the base stations BS1 to BS3, wherein these commands may comprise parameters.

Alternatively the Base Stations performs the KPI analysis and sends resulting spectrum requests (gimme more or less) to the CRN Management System.

Figure 11:
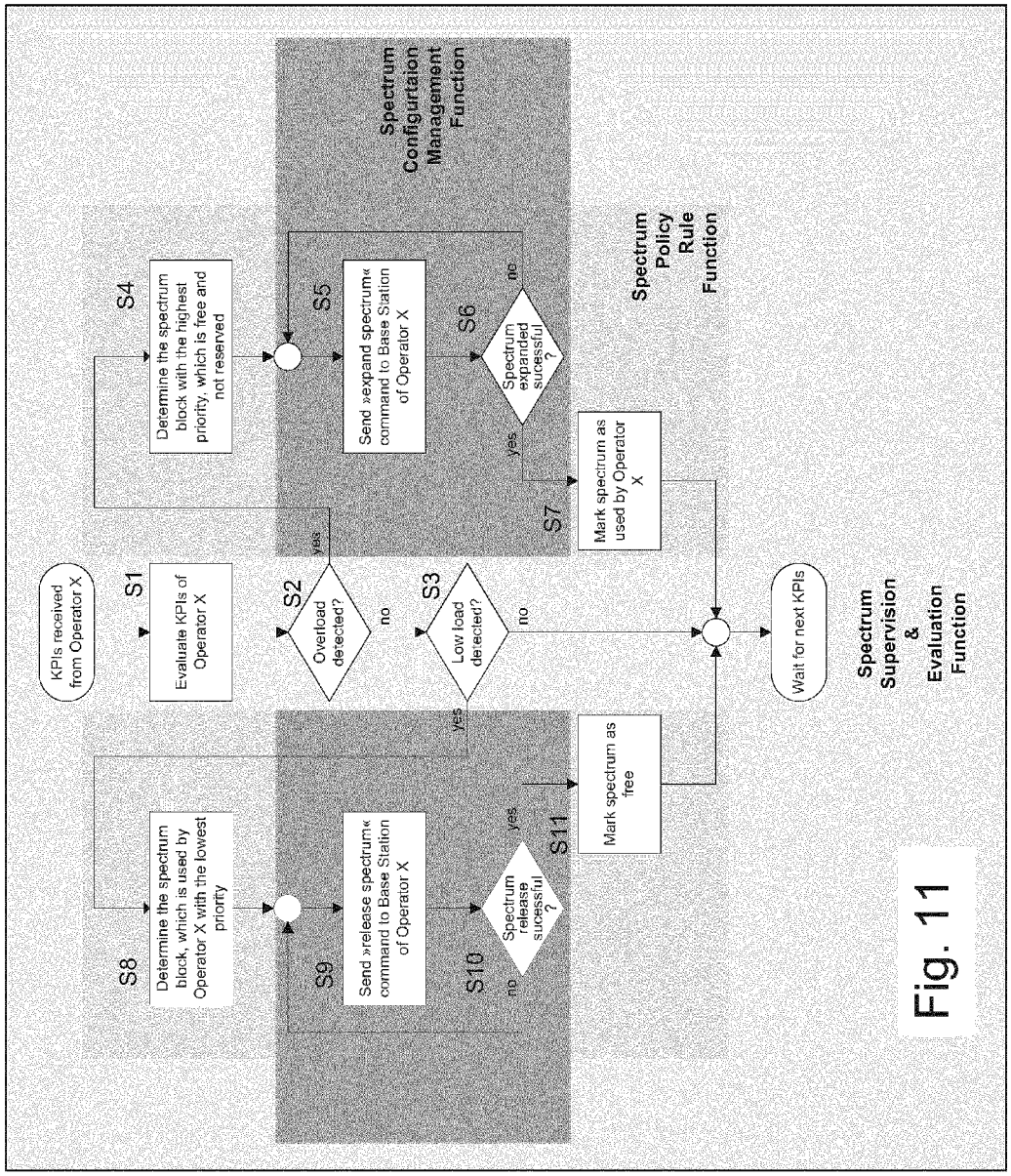
FIG. 11 shows a detailed process of spectrum allocation and de-allocation according to embodiments of the present invention.

A detailed process of the spectrum allocation and de-allocation according to an embodiment of the present invention is shown in FIG. 11. For the priority scheme configuration the Spectrum Policy Control Function is used. This functionality is not shown because the scheme is based on the simplified priority scheme method which allows to use a static table configuration. Such a functionality may be implemented as a sub-part of the internal CRN Management System.

The process starts when KPIs are received from an operator (here denoted by X). In step S1, the KPIs are evaluated. In step S2, it is checked whether an overload is detected, i.e., whether the received KPIs indicate such an overload. If this is the case, a new spectrum block (or spectrum sub block) will be allocated to the operator X. For this, the process proceeds to step S4, in which the spectrum block with the highest priority, which is free and not reserved is determined. In step S5, a "expand spectrum" command is sent to the corresponding base station of operator X. In step S6, it is checked whether the spectrum expansion was successful. If not, the process returns to step S5, in which the command is sent again. If yes, the process proceeds to step S7, in which the spectrum block is marked as used by operator X. Then, the present process is ended, i.e., it is waited for next KPIs.

If in step S2 no overload is detected, the process proceeds to step S3, in which it is checked whether a low load is detected. If this is the case, the process proceeds to step S8 in which the spectrum block (or spectrum sub block) which is used by the operator X with the lowest priority is determined. In step S9, a "release spectrum" command is sent to the corresponding base station of operator X. In step S10, it is checked whether the spectrum release was successful. If not, the process returns to step S9, in which the command is sent again. If yes, the process proceeds to step S10, in which the spectrum block is marked as free. Then, the present process is ended, i.e., it is waited for next KPIs.

If neither an overload nor a low load is detected (no in steps S2 and S3), the process is also ended.

Hence, according to embodiments described above, it is possible to reduce the spectrum fragmentation, which is achieved by introducing prioritization policies for spectrum blocks and/or considering a fragmentation probability. Thus, spectrum efficiency can be increased.

Moreover, due to the reduced spectrum fragmentation, handovers can be performed more efficiently, since in continuous spectrum block the requirement for large changes in basic parameters e.g. carrier frequency and/or bandwidth between neighbouring base stations of the same operator is reduced.

The invention is not limited to the specific examples described above.

For example, the determination of the fragmentation probability is not limited to the processes as described in connection with FIGS. 4 and 5. For example, also statistical evaluations or calculations in connection with the dependencies between different cells can be used to determine a fragmentation probability, instead of applying basic scenarios to a complex scenario.

Furthermore, the priorities as defined for the different spectrum blocks (or spectrum sub blocks) are not limited to the specific examples described above.

The frequency resources which are allocated to operators are not limited to the spectrum blocks and/or spectrum sub blocks or frequency blocks as described above.

According to a further aspect of embodiments of the present invention, an apparatus is provided which comprises
  means for determining a fragmentation probability which indicates a probability of fragmentation of frequency resources of at least two operators in at least one network section for at least one network operating entity.

According to another aspect of embodiments of the present invention, an apparatus is provided which comprises
  means for allocating and/or de-allocating frequency resources in at least one network section,
  means for defining priorities of frequency resources for at least one network operating entity individually, and
  means for performing allocating and/or de-allocating of the frequency resources for the at least one network operating entity based on the priorities.

It is to be understood that any of the above modifications can be applied singly or in combination to the respective aspects and/or embodiments to which they refer, unless they are explicitly stated as excluding alternatives.

For the purpose of the present invention as described herein above, it should be noted that
  method steps likely to be implemented as software code portions and being run using a processor at a network element or terminal (as examples of devices, apparatuses and/or modules thereof, or as examples of entities including apparatuses and/or modules therefore), are software code independent and can be specified using any known or future developed programming language as long as the functionality defined by the method steps is preserved;
  generally, any method step is suitable to be implemented as software or by hardware without changing the idea of the invention in terms of the functionality implemented;
  method steps and/or devices, units or means likely to be implemented as hardware components at the above-defined apparatuses, or any module(s) thereof, (e.g., devices carrying out the functions of the apparatuses according to the embodiments as described above, eNode-B etc. as described above) are hardware independent and can be implemented using any known or future developed hardware technology or any hybrids of these, such as MOS (Metal Oxide Semiconductor), CMOS (Complementary MOS), BiMOS (Bipolar MOS), BiCMOS (Bipolar CMOS), ECL (Emitter Coupled Logic), TTL (Transistor-Transistor Logic), etc., using for example ASIC (Application Specific IC (Integrated Circuit)) components, FPGA (Field-programmable Gate Arrays) components, CPLD (Complex Programmable Logic Device) components or DSP (Digital Signal Processor) components;
  devices, units or means (e.g. the above-defined apparatuses, or any one of their respective means) can be implemented as individual devices, units or means, but this does not exclude that they are implemented in a distributed fashion throughout the system, as long as the functionality of the device, unit or means is preserved;
  an apparatus may be represented by a semiconductor chip, a chipset, or a (hardware) module comprising such chip or chipset; this, however, does not exclude the possibility that a functionality of an apparatus or module, instead of being hardware implemented, be implemented as software in a (software) module such as a computer program or a computer program product comprising executable software code portions for execution/being run on a processor;
  a device may be regarded as an apparatus or as an assembly of more than one apparatus, whether functionally in cooperation with each other or functionally independently of each other but in a same device housing, for example.

It is noted that the embodiments and examples described above are provided for illustrative purposes only and are in no way intended that the present invention is restricted thereto. Rather, it is the intention that all variations and modifications be included which fall within the spirit and scope of the appended claims.

The invention claimed is:
1. An apparatus comprising:
  at least one processor; and
  at least one memory including computer program code, the at least one memory and the computer program code configured, with the at least one processor, to cause the apparatus at least to
  define priorities for use of one or more frequency resources for a first network operating entity and one or more second network operating entities individually, the first network operating entity operating a first part of one of more radio access networks and each of the one or more second network operating entities operating a respective second part of the one or more radio access networks; and
  allocate and/or de-allocate at least one of the one or more frequency resources for the first network operating entity for use in the first part of the one or more radio access networks based on the priorities,
  wherein fragmentation probability information is used to define the priorities, and
  wherein the fragmentation probability information depends on overlapping between the first part of the one or more radio access networks and at least one second part of the one or more radio access networks.
2. The apparatus according to claim 1, wherein
  a plurality of basic scenarios for overlappings of a cell to other cells is defined, and the processor is configured to determine the fragmentation probability by referring to the basic scenarios.

3. The apparatus according to claim 1, wherein the at least one processor and the at least one memory including computer program code are further configured to cause the apparatus to
determine a fragmentation probability for the first network operating entity and the one or more second network operating entities separately.

4. The apparatus according to claim 1, wherein the at least one processor and the at least one memory including computer program code are further configured to cause the apparatus to:
define a start frequency resource for the first network operating entity, and
define a highest priority for the start frequency resource for the first network operating entity.

5. The apparatus according to claim 4, wherein the at least one processor and the at least one memory including computer program code are further configured to cause the apparatus to
define priorities for subsequent frequency resources neighbouring the start frequency source with priorities in descending order.

6. The apparatus according to claim 1, wherein the at least one processor and the at least one memory including computer program code are further configured to cause the apparatus to
define priorities for frequency resources based on one or more of the following rules:
a neighbour frequency resource is given higher priority than other frequency resources, and/or
a neighbour frequency resource in a group of subsequent frequency resource which are not allocated is given a higher priority.

7. The apparatus according to claim 1, wherein
the at least one processor and the at least one memory including computer program code are further configured to cause the apparatus to
give priority to frequency resources owned by the first network operating entity when allocating frequency blocks to the first network operating entity.

8. The apparatus according to claim 1, wherein the at least one processor and the at least one memory including computer program code are further configured to cause the apparatus to
define priorities for frequency resources based on rules comprising:
for neighbour frequency resource groups of subsequent frequency resources having the same length, fragmentation probability is used to define the priority.

9. The apparatus according to claim 1, wherein the at least one processor and the at least one memory including computer program code are further configured to cause the apparatus to
define priorities for frequency resources based on rules comprising:
a direction of giving priorities to frequency resources is fixed until no more free frequency block is available or the direction is determined on said rules.

10. A method comprising:
defining priorities for use of one or more frequency resources for a first network operating entity and one or more second network operating entities individually, the first network operating entity operating a first part of one or more radio access networks and each of the one or more second network operating entities operating a respective second part of the one or more radio access networks; and
allocating and/or de-allocating at least one of the one or more frequency resources for the first network operating entity for use in the first part of the one or more radio access networks based on the priorities,
wherein fragmentation probability information is used to define the priorities, and
wherein the fragmentation probability information depends on overlapping between the first part of the one or more radio access networks and at least one second part of the one or more radio access networks.

11. The method according to claim 10, wherein
a plurality of basic scenarios for overlappings of a cell to other cells is defined, and the fragmentation probability is determined by referring to the basic scenarios.

12. The method according to claim 10, further comprising
defining a start frequency resource for each the first network operating entity, and
defining a highest priority for the start frequency resource for the first network operating entity.

13. The method according to claim 12, further comprising
defining priorities for subsequent frequency resources neighbouring the start frequency source with priorities in descending order.

14. The method according to claim 10, wherein priorities for frequency resources are defined based on one or more of the following rules:
a neighbour frequency resource is given higher priority than other frequency resources, and/or
a neighbour frequency resource in a group of subsequent frequency resource which are not allocated is given a higher priority.

15. A computer program product comprising a non-transitory computer-readable storage medium bearing computer program code embodied therein for use with a computer, the computer program code comprising code for performing the method of claim 10.

16. The method according to claim 10, wherein
a fragmentation probability for the first network operating entity and the one or more second network operating entities is determined separately.

17. The method according to claim 10, wherein the definition of priorities for frequency resources is based on rules comprising:
for neighbour frequency resource groups of subsequent frequency resources having the same length, fragmentation probability is used to define the priority.

18. The method according to claim 10, wherein the definition of priorities for frequency resources is based on rules comprising:
a direction of giving priorities to frequency resources is fixed until no more free frequency block is available or the direction is determined based on said rules.

* * * * *